United States Patent Office 3,428,683
Patented Feb. 18, 1969

3,428,683
STABILIZED POLYOXYETHYLENE ADDUCTS OF ALKYLAMINES AND METHOD FOR THE MANUFACTURE THEREOF
Robert A. Swenson, St. Louis Park, and Roscoe S. Smith, Minnetonka, Minn., assignors to Cargill Incorporated, Minneapolis, Minn., a corporation of Delaware
No Drawing. Filed Oct. 22, 1965, Ser. No. 502,598
U.S. Cl. 260—584          15 Claims
Int. Cl. C07c 91/02

ABSTRACT OF THE DISCLOSURE

Adducts of alkylamines containing between about 6 and 24 carbon atoms and at least about 0.001 gram equivalents per 100 grams of adduct of a primary amine or secondary dialkylamine containing at least 1 hydroxyl group as a color stabilizer, and a method of manufacturing such adducts by adding at least about 0.002 gram equivalents of the color stabilizer per 100 grams of adduct during reaction of a partially formed adduct with ethylene oxide.

This invention relates generally to polyoxyethylene adducts of alkylamines, and in particular it relates to polyoxyethylene adducts of alkylamines having good color stability, and to a method for the manufacture of light colored polyoxyethylene adducts of alkylamines.

Polyoxyethylene adducts of alkylamines are generally known, and may be prepared by either a catalytic process or a noncatalytic process. In the catalytic process, ethylene oxide is reacted with a primary or secondary alkylamine at elevated temperatures and pressures in the presence of an alkaline catalyst. The polyoxyethylene adducts obtained by the catalytic process are of a dark color, and accordingly are not satisfactory for some applications where a light colored product is desirable. Further, the catalytic process is somewhat difficult to control and the results are not fully reproducible.

In the non-catalytic process for the manufacture of polyoxyethylene adducts of alkylamines ethylene oxide is reacted with an alkylamine in a two stage reaction. In the first stage, a primary amine is reacted with ethylene oxide at a temperature above about 90° C. until one to two mols of ethylene oxide are reacted per mol of primary alkylamine, that is, one half to one equivalent of ethylene oxide per equivalent of alkylamine. The polyoxyethylene adduct containing one or two mols of ethylene oxide is then reacted with additional ethylene oxide in a second stage of the reaction at a temperature below about 90° C. until the desired amount of ethylene oxide has reacted with the alkylamine. A tertiary amine catalyst may be employed in the second stage to speed the reaction. It has also been indicated that in order to obtain light colored adducts employing the non-catalytic two stage reaction, the reaction in the first stage must be terminated when about one-half equivalent of ethylene oxide has reacted per equivalent of alkylamine, the reaction of any more than about one-half equivalent of ethylene oxide in the first reaction stage resulting in the formation of adducts having an undesired dark color when the reaction is completed in the second reaction stage.

Polyoxyethylene adducts of alkylamines, whether produced by the catalytic process or by the non-catalytic process, generally have poor color stability and have a tendency to darken with age, particularly in the presence of heat. Storage of polyoxyethylene adducts of alkylamines, and particularly those adducts containing in excess of four mols of ethylene oxide per mol of alkylamine, for several months at room temperature may result in the darkening of the adduct from a Gardner color of 1 to a Gardner color of 15. The color instability and darkening of polyoxyethylene adducts of alkylamines is undesirable in many instances where it is desired to use the adducts in a light colored product such as a hair shampoo or detergent. Further, in many instances, and particularly at high additions of ethylene oxide, it has not been heretofore possible to manufacture polyoxyethylene adducts of alkylamines by either the catalytic process or the non-catalytic process which have a desirable initial light color and uniform composition.

It is a principal object of the present invention to provide a polyoxyethylene adduct of an alkylamine of improved color stability. Another object is to provide a polyoxyethylene adduct of an alkylamine in which the distribution of the length of the polyoxyethylene groups is uniform. A further object is to provide a method for the manufacture of a polyoxyethylene adduct of an alkylamine which has a desirable light color and uniform composition.

Other objects and advantages of the present invention will become apparent from the following detailed description.

Generally, the present invention is directed to a polyoxyethylene adduct of an alkylamine of improved color stablity which includes a polyoxyethylene adduct of a primary or secondary alkylamine having alkyl radicals containing between about 6 and about 24 carbon atoms, and at least about 0.001 gram equivalents per hundred grams of the adduct of a color stabilizer selected from primary amines or secondary dialkylamines containing at least one hydroxyl group. The present invention is also directed to a method of manufacturing light colored polyoxyethylene adducts of alkylamines which includes the addition of at least about 0.002 gram equivalents per hundred grams of the adduct of the aforementioned color stabilizer at one or more points during the reaction of a polyoxyethylene adduct of a primary or secondary alkylamine with ethylene oxide at a temperature between about 40° C. and about 90° C.

It has been discovered that the presence of a small amount of a primary amine or a secondary dialkylamine containing at least one hydroxyl radical provides desired color stability to a polyoxyethylene adduct of an alkylamine. The precise reason for the stabilizing effect afforded by the small amount of amine is not fully understood. However, the results that are obtained are reproducible, and a complete understanding of the mechanism by which the stabilizing effect is attained is not considered to be essential to understanding of the present invention.

It is understood that when the term "equivalents" is used in respect to the color stabilizer, it is in reference to the number of primary amine groups; and when the term equivalents is used in respect to the reaction between an alkylamine and ethylene oxide it is in reference to the number of reactive hydrogens present in the alkylamine.

Polyoxyethylene adducts of either primary or secondary alkylamines may be stabilized in accordance with the present invention. The alkylamine that is reacted with the ethylene oxide may be a primary or secondary amine having alkyl radicals containing between about 6 and about 24 carbon atoms. Fatty primary and secondary amines containing between 12 and 24 carbon atoms have been found to be useful in the manufacture of surfactants.

The present invention is also applicable to polyoxyethylene adducts of alkylamines which include an ether linkage in the alkyl radical, for example, alkoxyalkyl primary or secondary amines. As used herein, the term "alkylamine" is intended to include alkoxyalkyl amines. In particular, the present invention contemplates stabilized γ-alkyloxypropyl primary and secondary amines.

The alkyl radicals may be saturated or unsaturated and may comprise a mixture of alkyl radicals of varying carbon chain length, for example, as obtained from fatty acids. A representative, but not limiting, list of alkylamines which may be reacted with ethylene oxide to provide the polyoxyethylene adducts to which the present invention pertains includes: cocoamine, tallowamine, hydrogenated tallowamine, soyaamine, hydrogenated soyaamine, laurylamine, oleylamine, stearylamine, palmitylamine, decylamine, octylamine, hexylamine, dicocoamine, ditallowamine, dilaurylamine, hexylstearylamine, laurylstearylamine, lauroxypropylamine, cocooxypropylamine, soyaoxybutylamine and ditallowoxypropylamine.

The primary or secondary alkylamine may be reacted with ethylene oxide by either of the previously described catalytic process or the non-catalytic process to provide a polyoxyethylene adduct of the alkylamine having the desired number of mols of ethylene oxide per mol of alkylamine. However, best results and the lightest colors are generally obtained when the non-catalytic process is utilized. The polyoxyethylene adduct product to be stabilized will in most instances contain more than about 2 mols of ethylene oxide per mol of alkylamine and, for most purposes the number of mols of ethylene oxide per mol of alkylamine does not generally exceed about one hundred, although in some instances it may be desirable to do so. Generally the adduct will contain between about 2 and about 50 mols of ethylene oxide.

The tendency of the adduct to darken is directly related to the number of mols of ethylene oxide reacted per mol of alkylamine. Unstabilized adducts having two mols of ethylene oxide per mol of alkylamine will darken slightly upon aging and unstabilized adducts having 4 or more mols of ethylene oxide per mol of alkylamine have very poor color stability and will change from a Gardner color of 1 to a Gardner color of 15 upon storage at room temperature for several months. The present invention is particularly directed to stabilized adduct compositions containing more than 4 mols of ethylene oxide per mol of alkylamine.

The color stabilizer that is added to the polyoxyethylene adduct of the alkylamine may be either a primary amine or a secondary dialkylamine containing at least one hydroxyl radical, or an acid salt thereof. Preferred color stabilizers are the primary normal alkylamines and secondary diethanolamines and diisopropanolamines. The term "primary amine" for purposes of the present invention, may be defined as all saturated and unsaturated alkyl primary amines, including diamines, aromatic primary amines and carbocyclic primary amines. It is contemplated that the alkyl or aryl radicals may be substituted with hydroxyl, nitro or nitrile radicals.

A representative list, not considered to be limiting upon the invention of amines which are useful as color stabilizers includes: methylamine, ethylamine, propylamine, isopropylamine, butylamine, hexylamine, octylamine, hydroxylamine, ethanolamine, isopropanolamine, cocoamine, tallowamine, soyaamine, diethanolamine, diisopropanolamine, benzylamine, aniline, ethylethanolamine, dodecyl-3-aminopropylether, ethylene diamine, and 1,3-propane diamine. The obvious components of cocoamines, tallowamines, and soyaamines, such as stearylamines, and laurylamines, etc., are also contemplated for use as color stabilizers.

It is generally desirable, but not necessary, to employ the same alkylamine as a color stabilizer as the alkylamine group of the polyoxyethylene adduct to be stabilized. In this manner, the product will have the most uniform composition.

The color stabilizer is preferably present in the polyoxyethylene adduct composition in an amount of at least about 0.001 gram equivalents of stabilizing amine per 100 grams of adduct in order to provide desired color stability. It is generally not necessary to employ more than about 0.005 gram equivalents of stabilizing amine per 100 grams of adduct in order to obtain color stability. However, it is contemplated that in some instances less than 0.001 or more than 0.005 gram equivalents of a stabilizing amine per hundred grams of the adduct may be employed, depending upon the efficiency of the particular stabilizing amine selected and the degree of color stability desired. For example, in some instances it may not be necessary to stabilize the color of the polyoxyethylene adduct to as great a degree as possible, and a Gardner color of 10 may be acceptable when the polyoxyethylene adduct is used in the petroleum industry whereas a Gardner color of 3 may be desirable when the same adduct is employed in shampoos. Accordingly, it is not necessary to include as much of the color stabilizer when the adduct is to be used in the petroleum industry. In such cases, it is possible to employ less than 0.001 equivalent of the color stabilizer per 100 grams of the adduct. In most instances, it has been found that an amount of from 0.0015 to 0.003 gram equivalents per 100 grams of adduct will be sufficient to provide desired color stability, The optimum level of between about 0.0015 and between about 0.003 gram equivalents of color stabilizer amine per 100 grams of polyoxyethylene adduct corresponds to between about 0.3 and about 0.6 percent primary cocoamine; between about 0.4 and about 0.8 percent primary tallowamine; between about 0.155 and about 0.31 percent diethanolamine; and between about 0.09 and about 0.18 percent of monoethanolamine by weight of the polyoxyethylene adduct.

The color stabilizer may be mixed with the polyoxyethylene adduct after the adduct has been prepared, or may be added to the reaction mixture during preparation of the adduct, as described hereinafter. Polyoxyethylene adducts of primary and secondary alkylamines which have been stabilized by the addition of a color stabilizer as described herein have substantially increased resistance to darkening upon aging, and may be stored for extended periods of time and in the presence of heat without substantially deteriorating or darkening in color.

It has also been discovered that polyoxyethylene adducts of primary and secondary alkylamines of an improved light color may be manufactured in a two stage reaction when a minor amount of the described color stabilizer is added at one or more points during the reaction in the second stage. In the first stage of the two stage reaction the alkylamine and ethylene oxide may be reacted in any convenient manner to provide a polyoxyethylene adduct of an alkylamine which contains a small amount of reacted ethylene oxide. The reaction in the first stage may be carried out in accordance with the described catalytic or non-catalytic process, as desired. However, the non-catalytic process is generally preferred in that the adduct product obtained has a lighter color than the adduct product obtained from the catalytic process. Generally, in order to effect reaction between the alkylamine and the ethylene oxide, the reaction in the first stage is carried out at a temperature above about 90° C., generally between 90° C. and 200° C.

In order to obtain a product having a desired light color, the reaction in the first stage should be controlled so that not more than about 1.5 equivalents, preferably about 1 equivalent, of ethylene oxide are reacted per equivalent of alkylamine. At higher additions of ethylene oxide, the adduct produced in the first reaction stage will have an undesirable dark color, resulting in the formation of a dark colored product in the second stage of the reaction. Thus an adduct of a primary alkylamine obtained from the first stage of the reaction desirably contains not more than 3 mols, preferably 2 mols, of ethylene oxide per mol of alkylamine, and an adduct of a secondary alkylamine desirably contains not more than 1.5 mols, preferably 1 mol of ethylene oxide per mol of alkylamine. Polyoxyethylene adducts of alkylamines having a desirable light color and a uniform composition are obtained when the reaction in the first stage is controlled to provide an adduct containing between about 0.75 and about 1.5 equivalents of ethylene oxide per equivalent of alkylamine.

The adduct obtained in the first stage of the reaction is then reacted with additional ethylene oxide in the second stage of the reaction at a temperature between about 40° C. and about 90° C., preferably between about 50° C. and about 80° C., in the presence of a minor amount of the previously described color stabilizer. The amount of nonamine present in the product, which is believed to be polyethylene glycol, has been found to be minimized when the reaction is carried out at lower temperatures.

It has been found that improved light color adducts are provided when at least about 0.002 gram equivalents of color stabilizer per hundred grams of the formed adduct product are added at one or more points during the reaction in the second stage. Inasmuch as the amine color stabilizer that is added to the reaction mixture also reacts with the ethylene oxide present in the reaction mixture to form additional polyoxyethylene adducts, it is not possible to set forth an exact concentration of color stabilizer necessary in order to provide the desired color stability. It has been found that if an insufficient amount of the color stabilizer is present, the adduct will darken during the reaction. It is important to be certain that at least about 0.002 gram equivalents of color stabilizer per 100 grams of adduct are added before the reaction is begun or during the initial portion of the reaction in the second stage when the reaction rate is very slow. It has been found that if the color stabilizer is not present during the initial portion of the reaction in the second stage, the color of the adduct will be appreciably darker. However, during the intermediate and terminal portions of the reaction in the second stage, the reaction between the alkylamine and the ethylene oxide takes place more rapidly and it is possible that the level of stabilizing amine may fall below about 0.002 gram equivalents per hundred grams of formed adduct without causing substantially darkening of the adduct product. This is particularly true at the end of the reaction, and in some instances it is desirable to control the addition of the color stabilizer in order that all of the stabilizer will have reacted with ethylene oxide by the time the reaction is terminated so that the product will be free from non-ethoxylated amines. It has been found that the reaction may be continued for a period of time of up to about one-half to about one hour after all of the color stabilizer has been reacted and still obtain a product having a desired light color.

In order to provide an average amount of 0.002 gram equivalents of the color stabilizer per 100 grams of formed adduct during the reaction, an excess of the color stabilizer may be added to the reaction mixture at the beginning of the reaction, for example, between about 0.025 and about 0.075 gram equivalents of color stabilizer per 100 grams of the polyoxyethylene adduct reactant obtained from the first stage of the reaction containing one equivalent of ethylene oxide per equivalent of alkylamine. It has been found that a more uniform adduct product may be obtained by adding the color stabilizer to the reaction mixture continuously or in increments throughout the reaction, for example, increments of between about 0.01 and about 0.015 gram equivalents of the color stabilizer per 100 grams of the adduct reactant obtained in the first stage of the reaction at the points corresponding to the reaction of 4, 6, 8, etc. mols of ethylene oxide per mol of alkylamine.

In a preferred embodiment of the manufacture of light colored polyoxyethylene adducts of alkylamines, an alkylamine is reacted with up to about 1.5 equivalents, preferably about 1 equivalent of ethylene oxide per equivalent of alkylamine in a first reaction stage at a temperature of between about 90° C. and about 200° C., preferably between about 130° C. and 150° C. The reaction may be carried out at a pressure between atmopheric and 200 p.s.i.g., preferably between atmospheric and about 50 p.s.i.g.

The polyoxyethylene adduct thus formed, is then reacted with additional ethylene oxide in a second reaction stage at a temperature between 40° C. and about 90° C., preferably between about 50° C. and about 80° C. and in the presence of an average amount of at least about 0.002 gram equivalents of a color stabilizer per 100 grams of the formed adduct present in the reaction mixture. The first stage of the reaction at the higher temperature may immediately precede the second stage of the reaction at the lower temperature in the same reaction vessel. Alternatively, the polyoxyethylene adduct formed in the first stage of the reaction may be transferred to a second reaction vessel for reaction in the second stage, or the adduct may be stored between the first and second stages of the reaction. No catalyst is necessary for the reaction in either the first or second stages of the reaction. However, an alkaline catalyst may be employed in the second stage of the reaction if it provides an adduct product having an acceptable light color.

It is contemplated that the amount of the color stabilizer added to the reaction mixture in the second stage of the reaction, in order to provide a product having a desired light color, may be suitably adjusted in order that the adduct product will contain a sufficient amount of color stabilizer to provide an adduct product having good color stability, and which will not darken upon aging. Thus, the amount of the color stabilizer present in the reaction mixture may be adjusted at the time the reaction is terminated in order to provide a product containing at least about 0.001 gram equivalents, preferably between about 0.001 and about 0.005 gram equivalents of color stabilizer per 1000 grams of the polyoxyethylene adduct product.

The polyoxyethylene adducts of alkylamines produced in accordance with the disclosed method have desired surfactant properties when used in wetting agents, emulsifiers, dispersants, foam depressants, and the like. The polyoxyethylene adducts are also useful as assistants in viscose spinning baths.

EXAMPLE I 1000 grams of distilled primary cocoamine, having an amine value of 274.5, was introduced into a flask equipped with a stirrer, thermometer, gas sparge tube and gas exhaust port. The primary cocoamine was heated to a temperature of 140° C. and the system was sparged with nitrogen. Ethylene oxide gas was then bubbled slowly through the primary cocoamine under conditions of vigorous agitation. After an induction period of three hours, the ethylene oxide began to react rapidly with the cocoamine. The reaction was exothermic and the flask was cooled to reduce the reaction temperature to 130° C. After one hour reaction time, the reaction rate slowed, and after a total reaction time of 75 mintues the ethylene oxide was turned off and the system was again sparged with nitrogen to remove unreacted ethylene oxide. The product was removed from the reaction flask and weighed, and it was determined that the amine had reacted with 468 grams of ethylene oxide thereby providing a polyoxyethylene adduct of primary cocoamine containing 2.18 mols of ethylene oxide per mol of amine. The adduct product had an amine value of 187.0.

600 grams of the formed polyoxyethylene adduct of the primary cocoamine was reintroduced into the reaction flask and 40 grams of primary cocoamine color stabilizer was added to the reaction mixture. The temperature of the mixture was raised to 70° C. and the system was sparged with nitrogen. Ethylene oxide gas was then bubbled slowly through the reaction mixture under conditions of vigorous agitation. After about 45 minutes induction period, the reaction was begun and the ethylene oxide rapidly reacted with the previously formed adduct. Cooling was necessary to maintain the reaction temperature between 70° C. and 75° C. After a reaction period of about four hours and 40 minutes, an additional 1126 grams of ethylene oxide had reacted with the previously formed adduct providing a polyoxyethylene adduct of primary cocoamine containing a total of 13.6 mols of ethylene oxide per mol of primary cocoamine.

The polyoxyethylene adduct had a Gardner color of 2. Two samples of the product were taken and 0.4 percent by weight primary cocoamine was added to one of the samples as a color stabilizer. Both samples were then subjected to an accelerated heat-aging test in a 50° C. oven for 48 hours. At the end of the heat-aging test, the sample containing no color stabilizer had a Gardner color of 15, while the sample containing 0.4 percent primary cocoamine color stabilizer did not darken and retained a Gardner color of 2.

EXAMPLE II

The processes described in Example I were repeated with the exception that 40 grams of a previously prepared ethylene oxide adduct of primary cocoamine containing two mols of ethylene oxide per mol of cocoamine was added to the 1000 grams of cocoamine introduced into the reaction flask. The presence of the previously prepared polyoxyethylene adduct reduced the induction period before the reaction between the primary cocoamine and ethylene oxide began from three hours to 1½ hours. At the end of a total reaction time of 75 minutes, a polyoxyethylene adduct product was obtained containing 2.18 mols of ethylene oxide per mol of polyoxyethylene cocoamine. The color of the adduct was nearly water white, and had a total amine value of 187.0.

250 grams of the polyoxyethylene adduct was introduced into a reaction flask and heated to 70° C. while the system was sparged with nitrogen. The adduct was then reacted with additional ethylene oxide gas in the absence of a color stabilizer. After 4½ hours, a polyoxyethylene adduct was obtained containing 16.3 mols of ethylene oxide per mol of primary cocoamine. The product had a Gardner color of 5, and a sample of the product which was heat aged overnight in a 50° C. oven had a Gardner color of 14.

EXAMPLE III 400 grams of primary tallowamine was introduced in the previously described reaction flask and heated to a temperature of 150° C. Ethylene oxide gas was then introduced into the tallowamine under conditions of vigorous agitation, and after about three hours induction time the ethylene oxide began to react rapidly with the tallowamine. The reaction temperature was slowly lowered to 135° C. and after 90 minutes 148 grams of ethylene oxide had reacted with the tallowamine, thereby providing a polyoxyethylene adduct containing 2.28 mols of ethylene oxide per mol of tallowamine.

55 grams of primary tallowamine was then added to the reaction mixture and the temperature was lowered to 70° C. during which time the system was sparged with nitrogen. When the lower temperature was reached, ethylene oxide gas was again introduced into the reaction mixture. After an induction period of about 45 minutes, the reaction began and after a reaction period of 7 hours and 15 minutes, an additional 1330 grams of ethylene oxide had reacted with the tallowamine. The product, containing 20 mols of ethylene oxide per mol of tallowamine had a Gardner color of 2+. Samples of the product were obtained and 0.3 percent primary tallowamine was added to one sample as a color stabilizer. Upon heat aging at 50° C. for 12 hours, the untreated sample had a Gardner color of 12 and the sample containing the primary tallowamine color stabilizer had a Gardner color of 4.

EXAMPLE IV 2270 grams of soyaamine primary amine, having a Gardner color of 2, an iodine value of 136 and a total amine value of 205.8 was introduced into the described reaction flask and heated to 140° C. Ethylene oxide gas was slowly bubbled through the soyaamine. After 4½ hours induction period, the reaction began and cooling was required to maintain the reaction temperature between 130° C. and 140° C. After a reaction period of 3 hours, 755 grams of ethylene oxide had reacted with the amine, corresponding to 2.05 mols of ethylene oxide per mole of primary soyaamine. The polyoxyethylene adduct had a total amine value of 155 and a Gardner color of 3.

800 grams of the adduct were then introduced into a reaction flask and 4 grams of primary soyaamine were added as a color stabilizer. The reaction mixture was heated to 70° C. while being sparged with nitrogen, and ethylene oxide gas was slowly bubbled through the reaction mixture at a temperature between 70° C. and 75° C. After 7½ hours, an additional 300 grams of ethylene oxide had reacted providing a polyoxyethylene adduct containing a total of 5.1 mols of ethylene oxide per mol of primary soyaamine. The adduct product had a Gardner color of 4+. One sample of the product was treated with 0.3 percent soya primary amine color stabilizer and another sample was untreated. After accelerated heat-aging in a 50° C. oven for 48 hours, the untreated sample had a Gardner color of 14 and the sample containing the color stabilizer had a Gardner color of 7.

EXAMPLE V

A polyoxyethylene adduct of primary cocoamine containing 2.18 mols of ethylene oxide per mol of primary cocoamine was prepared in accordance with Example I. 600 grams of the polyoxyethylene adduct containing 2.18 mols of ethylene oxide per mol of primary cocoamine was then reacted with additional ethylene oxide at a temperature of 70° C. with the incremental addition of a primary cocoamine color stabilizer. 1 percent by weight of the 2.18 mol polyoxyethylene adduct of primary cocoamine was initially added to the reaction mixture. An additional 1 percent by weight of the 2.18 mol polyoxyethylene adduct was added in increments during the reaction, 0.5 gram being added when about 6 mols of ethylene oxide had reacted and 0.5 percent was added when about 10 mols of ethylene oxide had reacted.

A polyoxyethylene adduct product was obtained which contained a total of 14.85 mols of ethylene oxide per mol of primary cocoamine and which had a Gardner color of 2.

The polyoxyethylene adduct of primary cocoamine product was divided into a number of samples to which various color stabilizers were added. Each sample contained 50 grams of the adduct, and the samples were subjected to an accelerated heat-aging test at 50° C. for 48 hours. The results of the tests are set forth in Table I.

TABLE I

| Sample | Color stabilizer, percent by weight | Initial Gardner color | Heat aged Gardner color |
|---|---|---|---|
| Control | None | 2 | 15 |
| 1 | 0.5% n-butylamine | 2 | 1.5 |
| 2 | 0.5% n-octylamine | 2 | 2 |
| 3 | 0.4% cocoamine | 2 | 3.5 |
| 4 | 0.5% dodecyl-3-aminopropylether | 2 | 4 |
| 5 | 0.5% monoethanolamine | 2 | 1 |
| 6 | 0.5% monoisopropanolamine | 2 | 2 |
| 7 | 0.5% benzylamine | 2 | 4 |
| 8 | 0.5% aniline | 2 | 11+ |
| 9 | 0.5% isopropylamine | 2 | 5 |
| 10 | 0.4% tert-octylamine | 2 | 11 |
| 11 | 0.4% Primene 81-R [1] | 2 | 12+ |
| 12 | 0.8% Primene JMT [1] | 2 | 11+ |
| 13 | 0.5% diethylamine | 2 | 13 |
| 14 | 0.5% di-n-butylamine | 2 | 15+ |
| 15 | 0.5% diethanolamine | 2 | 2+ |
| 16 | 0.5% diisopropanolamine | 2 | 2+ |
| 17 | 0.5% methylethanolamine | 2 | 2+ |
| 18 | 0.5% ethylethanolamine | 2 | 3 |
| 19 | 0.5% n-dodecylethanolamine | 2 | 8 |
| 20 | 1.0% n-dodecylethanolamine | 2 | 4 |
| 21 | 0.5% iminodipropionitrile | 2 | 13 |
| 22 | 0.5% morpholine | 2 | 11+ |
| 23 | 0.5% triethanolamine | 2 | 13 |
| 24 | 0.5% dimethylethanolamine | 2 | 13 |
| 25 | 0.5% methyldiethanolamine | 2 | 13 |
| 26 | 0.5% diethylethanolamine | 2 | 13 |
| 27 | 0.5% triisopropanolamine | 2 | 13 |
| 28 | 0.5% cocotrimethylammonium chloride | 2 | 14+ |
| 29 | 0.5% n-coco 1,3 propane diamine diacetate | 2 | 5 |
| 30 | 0.3% hydroxylamine hydrochloride | 2 | 2 |
| 31 | 0.1% ethylene diamine | 2 | 2 |
| 32 | 0.4% trisdiethanolamine phosphate | 2 | 6+ |
| 33 | 0.5% cocoamine acetate | 2 | 7+ |
| 34 | 0.8% cocoamine acetate | 2 | 3 |
| 35 | 0.5% cocoamine hydrochloride | 2 | 5 |
| 36 | 1.0% cocoamine hydrochloride | 2 | 3 |

[1] Tertiary alkyl primary amines.

It can be seen from Table I that all primary amines have some effectiveness as color stabilizers. n-Alkyl primary amines provided excellent color stability with secondary alkyl primary amines being less effective than n-alkyl primary amines and more effective than tertiary alkyl primary amines and aromatic primary amines. Secondary dialkylamines contain at least one hydroxyl radical also provided good color stability and appeared to be as effective as n-alkyl primary amines. Tertiary amines and quaternary ammonium salts apparently have little or no effect on the color stability. Acid salts of the color stabilizers were also effective.

EXAMPLE VI

A further amount of a polyoxyethylene adduct of primary cocoamine containing 15 mols of ethylene oxide per mol of primary cocoamine was prepared in accordance with Example V. 100 gram samples of the adduct were prepared to determine the concentration of primary n-alkylamine color stabilizers necessary to effect the desired color stability, and the samples were subjected to accelerated heat-aging for 48 hours at 50° C. The results are set forth in Table II.

TABLE II

| Sample | Color Stabilizer, percent by weight | Equivalents of Color stabilizer per 100 grams of adduct | Initial Gardner Color | Heat-Aged Gardner color |
|---|---|---|---|---|
| Control | None | None | 2 | 15 |
| 37 | 0.05% n-butylamine | 0.00068 | 2 | 15 |
| 38 | 0.1% n-butylamine | 0.00137 | 2 | 10 |
| 39 | 0.15% n-butylamine | 0.00205 | 2 | 4 |
| 40 | 0.1% n-octylamine | 0.00077 | 2 | 11+ |
| 41 | 0.2% n-octylamine | 0.00155 | 2 | 5+ |
| 42 | 0.3% n-octylamine | 0.00233 | 2 | 3 |
| 43 | 0.1% cocoamine | 0.00050 | 2 | 11+ |
| 44 | 0.2% cocoamine | 0.00100 | 2 | 9 |
| 45 | 0.3% cocoamine | 0.00150 | 2 | 5 |
| 46 | 0.4% cocoamine | 0.00200 | 2 | 3 |
| 47 | 0.2% tallowamine | 0.00076 | 2 | 10+ |
| 48 | 0.4% tallowamine | 0.00152 | 2 | 5 |
| 49 | 0.6% tallowamine | 0.00228 | 2 | 3+ |

Table II indicates that the color stability of the adducts is related to the number of equivalents of color stabilizers present in the composition. It will be seen that at concentrations less than about 0.001 gram equivalents of color stabilizer per 100 grams of adduct the color stability is not greatly improved, whereas at concentrations above 0.001 gram equivalents per 100 grams of adduct, and particularly between 0.0015 and 0.003 gram equivalents per 100 grams of adduct, an adduct having good color stability is provided.

EXAMPLE VII

A polyoxyethylene adduct of primary cocoamine containing 2.18 mols of ethylene oxide per mol of primary cocoamine prepared in accordance with Example I was reacted with additional ethylene oxide at 180° C. in the presence of 0.2 percent by weight potassium hydroxide catalyst. The reaction was continued until an adduct was obtained containing 15.68 mols of ethylene oxide per mol of polyoxyethylene amine. The adduct had a Gardner color of 7. A sample of the adduct was stabilized with 0.4 percent by weight primary cocoamine. After heat-aging at 50° C. for 48 hours, a sample containing no color stabilizer had a Gardner color of 13 while the sample containing the primary cocoamine color stabilizer retained a Gardner color of 7.

EXAMPLE VIII

A three gallon stainless steel pressure reactor was fitted with an agitator, electric heating coils, and water cooling coils and 5100 grams of primary cocoamine was introduced into the reactor. The reactor was sparged with nitrogen and was heated to 130° C. Ethylene oxide gas was then forced into the reactor until a pressure of 30 p.s.i.g. was obtained. After 25 minutes induction period the ethylene oxide began to rapidly react with the cocoamine. Additional ethylene oxide was added to the reactor to maintain a pressure of 20 to 30 p.s.i.g. until a total of 2400 grams of ethylene oxide was added to the reactor. The pressure was then allowed to drop to 5 p.s.i.g. at which time the reactor was vented, sparged with nitrogen and cooled. A polyoxyethylene adduct of primary cocoamine was obtained containing 2.2 mols of ethylene oxide per mol of cocoamine. The product had a Gardner color of 1 and a total amine value of 185.5.

1960 grams of the product was introduced into the same pressure reactor and 20 grams of primary cocoamine color stabilizer was added thereto. The reaction mixture was heated to 70° C. while being sparged with nitrogen and additional amounts of ethylene oxide were introduced into the reactor at pressures of 30 p.s.i.g. After an induction period of about 15 minutes the ethylene oxide began to react. The ethylene oxide pressure was maintained between 20 and 30 p.s.i.g. until an additional 3800 grams of ethylene oxide had been added to the reactor. During the addition of the ethylene oxide, further amounts of the primary cocoamine stabilizer were added in 5 gram increments at the point where 4.5 mols, 7 mols, 9 mols and 11 mols of ethylene oxide had reacted, thus making a total of 40 grams of primary cocoamine color stabilizer added to the reaction mixture.

A product was obtained having a total amine value of 64.5 and containing 15.05 mols of ethylene oxide per mol of primary cocoamine. The product had a Gardner color of 4. An untreated sample and a sample containing 0.4 percent by weight primary cocoamine color stabilizer were subjected to accelerated heat-aging for 48 hours at 50° C. After heat-aging the untreated sample had a Gardner color of 14 after heat-aging, whereas the sample containing the color stabilizer had a Gardner color of 5.

EXAMPLE IX 5000 grams of secondary dihydrogenated tallow-amine having a total amine value of 112.9, a primary amine value of 9.2, a secondary amine value of 2.8 and having a Gardner color of 1, was introduced into the described three gallon pressure reactor. The amine was heated to 150° C. while being sparged with nitrogen, and thereafter ethylene oxide was forced into the reactor at 30 p.s.i.g. After a 2 hour induction period at 150° C. the ethylene oxide began to react rapidly, additional ethylene oxide being added to keep the reaction pressure between 25 and 30 p.s.i.g. After a reaction period of 4 hours the dihydrogenated tallowamine had reacted with 480 grams of ethylene oxide, corresponding to about 1.02 mols of ethylene oxide per mol of tallowamine. The product had a Gardner color of 1 and a total amine value of 103.0.

3400 grams of the product was introduced back into the pressure reactor and heated to 75° C. while being sparged with nitrogen. Ethylene oxide was again forced into the pressure reactor at a pressure of 40 p.s.i.g. The ethylene oxide reacted very slowly, and after 10 hours 2600 additional grams of ethylene oxide had reacted. The polyoxyethylene adduct product contained a total of 10.6 mols of ethylene oxide per mol of dihydrogenated tallowamine and had a Gardner color of 3. The product was a waxy solid at room temperature.

100 grams of the adduct was treated with 0.4 gram of primary hydrogenated tallowamine color stabilizer, and after 72 hours accelerated heat-aging in a 65° C. oven the stabilized sample had a Gardner color of 5, whereas an untreated sample had a Gardner color of 11.

EXAMPLE X 1000 grams of distilled primary cocoamine, having amine value of 276, was introduced into the reactor described in Example I. The amine was heated to a temperature of 200° C. and sparged with nitrogen. Ethylene oxide gas was bubbled through the amine with vigorous agitation. The induction period at 200° was 1½ hours after which the ethylene oxide began to react rapidly with the amine. The temperature was maintained between 195° and 200° C. for a total reaction time of 30 minutes. At the end of this time the product was sparged with nitrogen and cooled. The product was weighed, and it was determined that 435 grams of ethylene oxide had reacted with the amine, corresponding to 2.0 mols of ethylene oxide per mol of amine. The product had a color of 1 Gardner and a total amine value of 193.

600 grams of the product was reintroduced into the reaction flask together with 3 grams of primary cocoamine color stabilizer. The temperature was raised to 50° C. and the system was sparged with nitrogen. Ethylene oxide gas was then introduced while the mixture was agitated vigorously. The induction period was about 4 hours in length, and the following reaction was relatively slow. Three one-gram increments of primary cocoamine color stabilizer were adder to the mixture at approximately the 5, 10, and 15 mol addition points. After a reaction time of 7½ hours, not including induction period, the adduct had reacted with 1660 grams of ethylene oxide, providing 20.1 mols of ethylene oxide per mol of primary cocoamine. The product had a total amine value of 48.7 and a Gardner color of 3. The product was sparged with nitrogen and cooled, and a sample was removed. To the rest of the batch was added 0.3% diethanolamine color stabilizer. The untreated sample, and a sample of the stabilized product were aged for 48 hours in a 50° C. oven. The sample containing no stabilizer darkened to a Gardner color of 16 while the stabilized product retained a Gardner color of 3.

EXAMPLE XI 300 grams of distilled dodecoxypropylamine having an amine value of 224, prepared by hydrogenation of the acrylonitrile adduct of dodecyl alcohol, was introduced into the reactor described in Example I. The amine was reacted with ethylene oxide gas at 130° C. with vigorous agitation. The induction period took 3 hours. After an additional 50 minutes of reaction the product was sparged with nitrogen, cooled, and weighed. It was found that the amine had reacted with 111 grams of ethylene oxide corresponding to 2.1 mols of ethylene oxide per mol of dodecoxypropylamine. The product was water white and had a total amine value of 163.

300 grams of the ethylene oxide adduct thus formed was charged back into the reactor, together with 3 grams of primary dodecoxypropylamine. The mixture was heated to 70° C. and sparged with nitrogen. Ethylene oxide gas was then introduced. The induction period was approximately 1 hour 45 minutes, and the reaction required an additional 5 hours. Two one-gram increments of primary dodecoxypropylamine color stabilizer were added at approximately the 4 mol and 8 mol addition points. Finally the mixture was cooled and weighed and it was determined that the adduct had reacted with an additional 395 grams of ethylene oxide, corresponding to a total of 12.4 mols per mol of primary dodecoxypropylamine. The product had a Gardner color of 1 and a total amine value of 71.1. A sample was taken and 0.3% primary dodecoxypropylamine color stabilizer was added thereto. On 48 hour heat-aging in a 50° C. oven, the unstabilized sample darkened to a Gardner color of 8 while the stabilized sample had a Gardner color of 2.

EXAMPLE XII 1500 grams of tallow diamine (N-tallow-1,3-propane diamine) (total amine value 327.3, primary amine value 155.3, secondary amine value 169.1) was charged to the reactor described in Example I. The material was reacted with ethylene oxide at a temperature of 135° C. The induction period was 2½ hours, after which the reaction was continued for 2 hours. The product was cooled and weighed, and it was found that 610 grams of ethylene oxide had been added, corresponding to 3.3 mols of ethylene oxide per mol of tallow diamine. The product had a Gardner color of 3 and had a total amine value of 236.

400 grams of the product thus prepared, and 4 grams of tallow diamine color stabilizer were charged to the reactor and reacted with ethylene oxide gas at 70°–75° C. An additional 2 grams of tallow diamine color stabilizer was added to the reaction mixture at about the 7 mol and the 10 mol addition points. The induction period was about 40 minutes, and the reaction required an additional 2½ hours. After the product was sparged with nitrogen, cooled, and weighed, a sample was taken, and 0.75% of tallow diamine was added to the remainder of the batch. The product had reacted with 390 grams of ethylene oxide thus providing a product containing approximately 14 mols of ethylene oxide per mol of tallow diamine. The product had a Gardner color of 4 and a total amine value of 117.0.

After 48 hours heat-aging in a 50° C. oven, the stabilized product had a Gardner color of 5 while the untreated product darkened to a Gardner color of 15.

It can be seen that polyoxyethylene adducts of primary and secondary alkylamines have been disclosed which have improved color stability. The adduct compositions do not darken appreciably upon aging and may be successfully utilized in various formulations which require light colored compositions. Further, a method has been disclosed for the manufacture of polyoxyethylene adducts of primary and secondary amines which have a light color which could not be attained utilizing previously known processes.

Although certain features of the invention have been set forth with particularly in order to describe the invention, various alternatives within the skill of the art are contemplated.

Various features of the invention have been set forth in the following claims.

What is claimed is:

1. A stabilized polyoxyethylene adduct of an alkylamine comprising a polyoxyethylene adduct of a primary or secondary alkylamine or γ-alkoxyalkylamine having alkyl radicals containing between about 6 and about 24 carbon atoms, and at least about 0.001 gram equivalents per 100 grams of said adduct of a color stabilizer selected from primary amines or secondary dialkylamines containing at least one hydroxyl radical.

2. A stabilized polyoxyethylene adduct of an alkylamine comprising a polyoxyethylene adduct of a primary or secondary alkylamine or γ-alkoxyalkylamine having alkyl radicals containing between about 6 and about 24 carbon atoms, and between about 0.001 and about 0.005 gram equivalents per 100 grams of said adduct of a color stabilizer selected from primary amines or secondary dialkylamines containing at least one hydroxyl radical.

3. A stabilized polyoxyethylene adduct of an alkylamine comprising a polyoxyethylene adduct of a primary or secondary alkylamine or γ-alkoxypropylamine having alkyl radicals containing between about 6 and about 24 carbon atoms, and between about 0.0015 and about 0.003 gram equivalents per 100 grams of said adduct of a color stabilizer selected from primary amines or secondary dialkylamines containing at least one hydroxyl radical.

4. A stabilized polyoxyethylene adduct of an alkylamine comprising a polyoxyethylene adduct of a primary or secondary alkylamine or γ-alkoxypropylamine having alkyl radicals containing between about 6 and about 24 carbon atoms, said adduct containing at least about 4 mols of ethylene oxide per mol of alkylamine, and at least about 0.001 gram equivalents per 100 grams of said adduct of a color stabilizer selected from primary amines or secondary dialkylamines containing at least one hydroxyl radical.

5. A stabilized polyoxyethylene adduct of an alkylamine comprising a polyoxyethylene adduct of a primary or secondary alkylamine or γ-alkoxypropylamine having alkyl radicals containing between about 12 and about 24 carbon atoms, said adduct containing at least about 4 mols of ethylene oxide per mol of alkylamine, and between about 0.001 and about 0.005 gram equivalents per 100 grams of said adduct of a color stabilizer selected from primary amines or secondary dialkylamines containing at least one hydroxyl radical.

6. A stabilized polyoxyethylene adduct of an alkylamine comprising a polyoxyethylene adduct of a primary or secondary alkylamine or γ-alkoxypropylamine having alkyl radicals containing between about 12 and about 24 carbon atoms, said adduct containing at least about 4 mols of ethylene oxide per mol of alkylamine, and between about 0.0015 and about 0.003 gram equivalents per 100 grams of said adduct of a color stabilizer selected from primary amines or secondary dialkylamines containing at least one hydroxyl radical.

7. A stabilized polyoxyethylene adduct of an alkylamine comprising a polyoxyethylene adduct of a primary alkylamine or γ-alkoxypropylamine having an alkyl radical containing between about 12 and about 24 carbon atoms, said adduct containing at least about 4 mols of ethylene oxide per mol of alkylamine, and between about 0.001 and about 0.005 gram equivalents per 100 grams of said adduct of a color stabilizer selected from primary amines or secondary dialkylamines containing at least one hydroxyl radical.

8. A stabilized polyoxyethylene adduct of an alkylamine comprising a polyoxyethylene adduct of a primary n-alkylamine or γ-n-alkoxypropylamine having an alkyl radical containing between about 12 and about 24 carbon atoms, said adduct containing at least about 4 mols of ethylene oxide per mol of alkylamine, and between about 0.001 and about 0.005 gram equivalents per 100 grams of said adduct of the same primary n-alkylamine or γ-n-alkoxypropylamine used to form said adduct.

9. A method for the manufacture of stabilized light colored polyoxyethylene adducts of primary or secondary alkylamines comprising reacting a polyoxyethylene adduct of a primary or secondary alkylamine or alkoxyalkylamine having alkyl radicals containing between about 6 and about 24 carbon atoms, and containing not more than about 1.5 equivalents of ethylene oxide per equivalent of amine, with ethylene oxide at a temperature between about 40° C. and about 90° C. in the presence of a minor amount of a color stabilizer selected from primary amines and secondary dialkylamines containing at least one hydroxyl radical.

10. A method for the manufacture of stabilized light colored polyoxyethylene adducts of primary or secondary alkylamines comprising reacting a polyoxyethylene adduct of a primary or secondary alkylamine or alkoxyalkylamine having alkyl radicals containing between about 6 and about 24 carbon atoms, and containing between about 0.75 and about 1.5 equivalents of ethylene oxide per equivalent of amine, with ethylene oxide at a temperature between about 40° C. and about 90° C. in the presence of a minor amount of a color stabilizer selected from primary amines and secondary dialkylamines containing at least one hydroxyl radical.

11. A method for the manufacture of stabilized light colored polyoxyethylene adducts of primary or secondary alkylamines comprising reacting a primary or secondary alkylamine or γ-alkoxyalkylamine having alkyl radicals containing between about 6 and about 24 carbon atoms with ethylene oxide at a first temperature of between about 90° C. and about 200° C. until not more than about 1.5 equivalents of ethylene oxide have reacted per equivalent of amine, and thereafter reacting the polyoxyethylene adduct formed at said first temperature with additional ethylene oxide at a second temperature of between about 40° C. and about 90° C., the reaction at said second temperature being carried out in the presence of a minor amount of a color stabilizer selected from primary amines and secondary dialkylamines containing at least one hydroxyl radical.

12. A method for the manufacture of stabilized light colored polyoxyethylene adducts of primary or secondary alkylamines comprising reacting a primary or secondary alkylamine or γ-alkoxyalkylamine having alkyl radicals containing between about 6 and about 24 carbon atoms with ethylene oxide at a first temperature of between about 90° C. and about 200° C. until between about 0.75 and about 1.5 equivalents of ethylene oxide have reacted per equivalent of alkylamine, and thereafter reacting the polyoxyethylene adduct formed at said first temperature with additional ethylene oxide at a second temperature of between about 40° C. and about 90° C. until a polyoxyethylene adduct is provided containing at least about 4 mols of ethylene oxide per mol of alkylamine, and adding at least about 0.002 gram equivalents per 100 grams of adduct product of a color stabilizer selected from primary amines and secondary dialkylamines containing at least one hydroxyl radical to the reaction at said second temperature.

13. A method for the manufacture of stabilized light colored polyoxyethylene adducts of primary or secondary alkylamines comprising reacting a primary or secondary alkylamine or γ-alkoxypropylamine having alkyl radicals containing between about 6 and about 24 carbon atoms with ethylene oxide at a first temperature of between about 130° C. and about 150° C. until between 0.75 and about 1.5 equivalents of ethylene oxide have reacted per equivalent of alkylamine, and thereafter reacting the polyoxyethylene adduct formed at said first temperature with additional ethylene oxide at a second temperature of between about 50° C. and about 80° C. until a polyoxyethylene adduct is provided containing at least about 4 mols of ethylene oxide per mol of alkylamine, the reaction at said second temperature being carried out in the presence of a color stabilizer selected from primary amines and secondary dialkylamines containing at least one hydroxyl radical, the amount of said color stabilizer present during the reaction at said second temperature being controlled so that at least about 0.002 gram equivalents per 100 grams of adduct product are present during the initial portion of the reaction and so that substantially no unreacted color stabilizer is present at the end of the reaction.

14. A method for the manufacture of stabilized light colored polyoxyethylene adducts of primary or secondary alkylamines comprising reacting a primary or secondary alkylamine or γ-alkoxypropylamine having alkyl radicals containing between about 6 and about 24 carbon atoms with ethylene oxide at a first temperature of between about 130° C. and about 150° C. until between about 0.75 and about 1.5 equivalents of ethylene oxide have reacted per equivalent of alkylamine, and thereafter reacting the polyoxyethylene adduct formed at said first temperature with additional ethylene oxide at a second temperature of between about 50° C. and about 80° C. until a polyoxyethylene adduct is provided containing at least about 4 mols of ethylene oxide per mol of alkylamine, the reaction at said second temperature being carried out in the presence of a color stabilizer selected from primary amines and secondary dialkylamines containing at least one hydroxyl radical, said stabilizer being added in increments of between about 0.01 and about 0.015 gram equivalents per 100 grams of the adduct formed at said first temperature.

15. A method for the manufacture of stabilized light colored polyoxyethylene adducts of primary alkylamines comprising reacting a primary n-alkylamine or γ-n-alkoxypropylamine having an alkyl radical containing between about 6 and about 24 carbon atoms with ethylene oxide at a first temperature of between about 130° C. and about 150° C. until about 1 equivalent of ethylene oxide has reacted per equivalent of alkylamine, and thereafter reacting the polyoxyethylene adduct formed at said first temperature with additional ethylene oxide at a second temperature of between about 50° C. and about 80° C. until a polyoxyethylene adduct is provided containing at least about 4 mols of ethylene oxide per mol of alkylamine, and adding at least about 0.002 gram equivalents per 100 grams of adduct of the same primary n-alkylamine or γ-n-alkoxypropylamine used to form the adduct to the reaction at said second temperature.

References Cited

UNITED STATES PATENTS 3,040,076   6/1962   Seidal et al.

CHARLES B. PARKER, *Primary Examiner.*

R. L. RAYMOND, *Assistant Examiner.*

U.S. Cl. X.R.

252—357